United States Patent Office 3,493,717
Patented Feb. 3, 1970

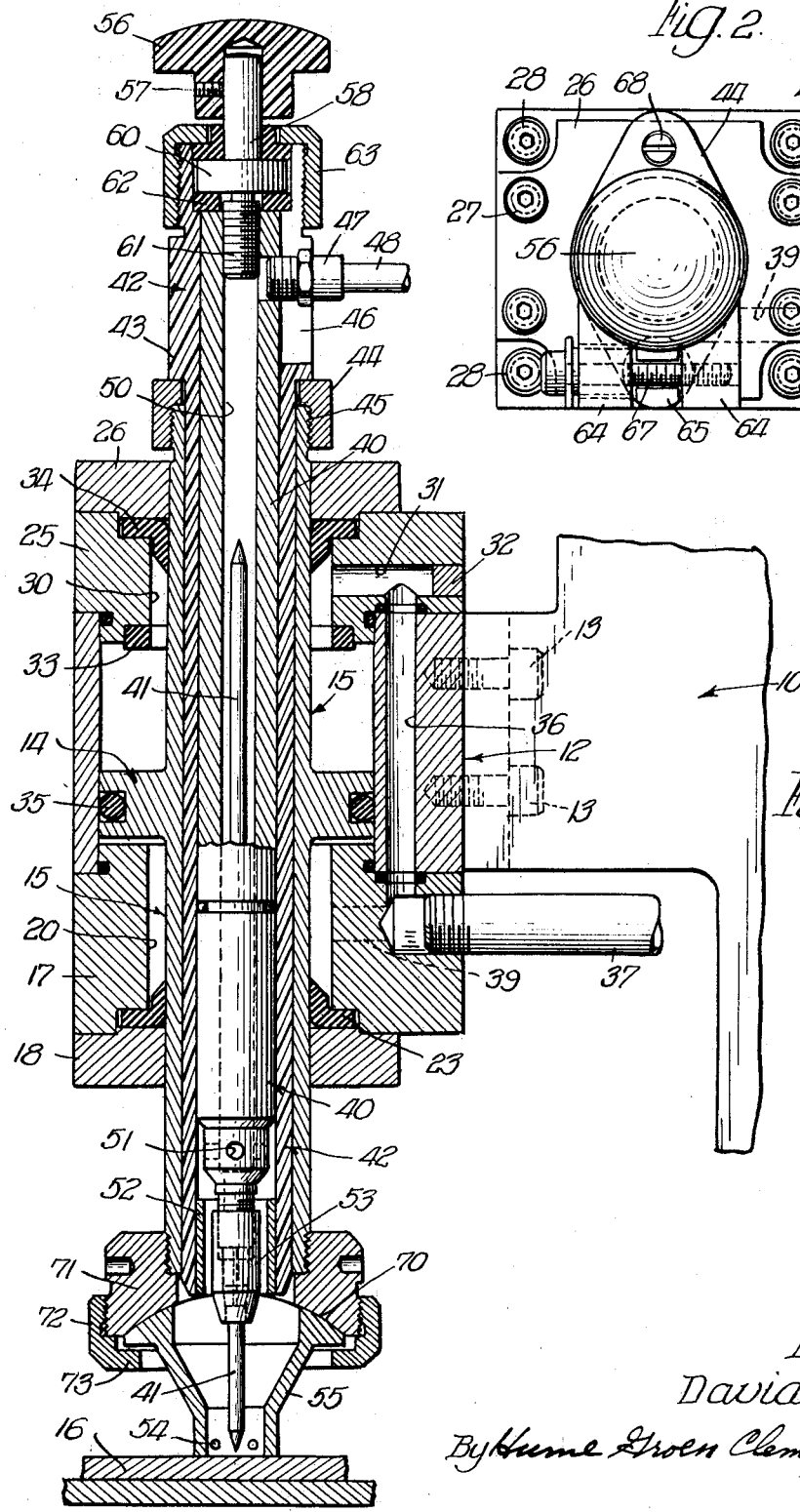

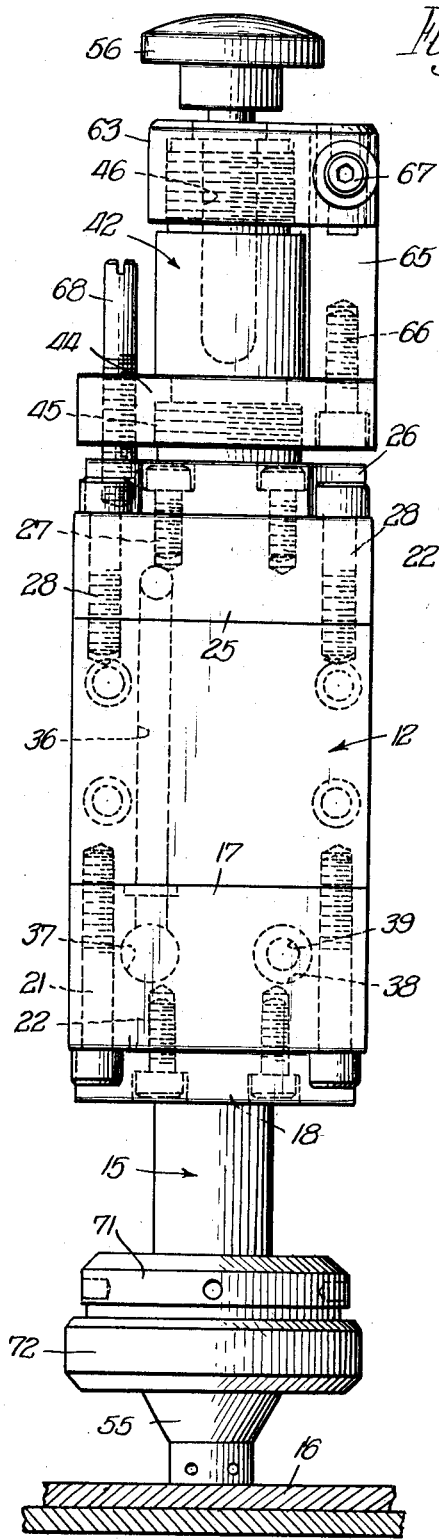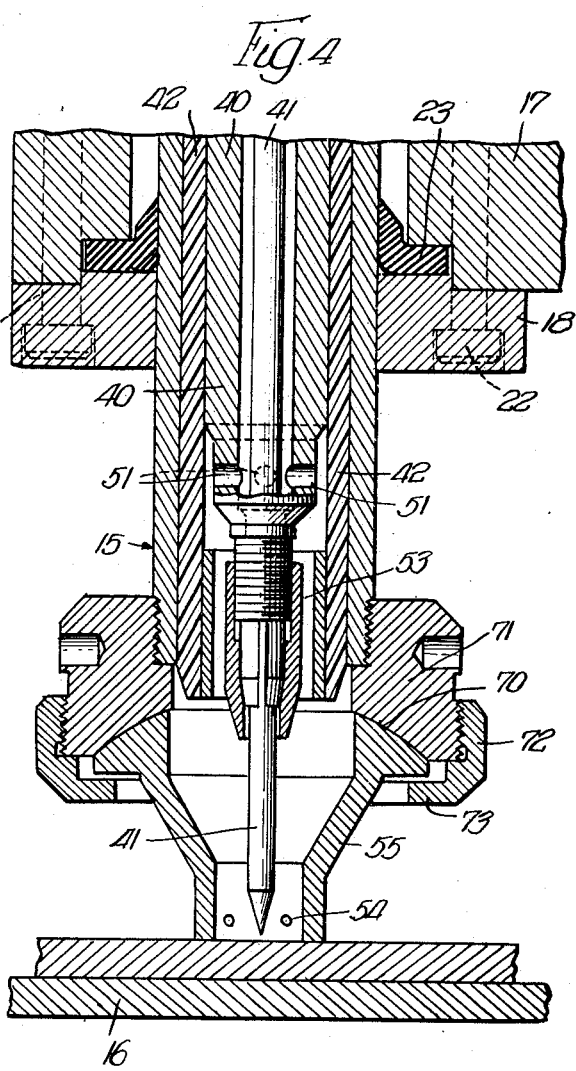

3,493,717
PRESSURIZED SPOT WELDING ARC
GUN ASSEMBLY
David Sciaky, Chicago, Ill., assignor to Welding Research,
Inc., a corporation of Illinois
Filed Aug. 26, 1965, Ser. No. 482,740
Int. Cl. B23k 9/00, 11/10, 9/24
U.S. Cl. 219—127                              7 Claims

ABSTRACT OF THE DISCLOSURE

For electric arc welding the invention provides a power cylinder having a hollow piston which retains a welding torch so that the torch and the electrode of the torch are reciprocated as the piston is pressure actuated. The power cylinder has a fixed relation with respect to the workpiece and the depending end of the hollow piston carries a nozzle which surrounds the electrode and which is carried in a manner permitting swivelling on an arc the center of which is on the workpiece so that the nozzle will accommodate itself to the workpiece.

---

The invention relates to welding apparatus and has reference in particular to an assembly wherein a welding torch is carried by the piston of a power cylinder in a manner which makes possible the application of the desired pressure on the workpieces for holding the workpieces during the welding process.

In the welding method generally referred to as Tig spot welding, the electrode consists of a thin tungsten rod, and during the welding process the said rod is surrounded by a flow of protective inert gas. The tungsten electrode is connected to one terminal of the current source and the metal workpieces to be welded are connected to the other terminal of the source. The welding apparatus of the invention employs a torch for Tig welding and which is carried within the hollow piston rod of a power cylinder so that the pressures as desired by the operator can be applied to the workpieces around the spot being welded and during the welding operation.

Another and more specific object is to provide a welding torch assembly wherein a tungsten inert gas welding torch is carried within the hollow piston rod of a power cylinder, and wherein provision is made by means of a swivel nozzle for the assembly to accommodate itself to the contour of the workpieces on which the welding is taking place.

Another object resides in the provision of a welding torch assembly of the character described wherein a pressure fluid can be applied alternately to above and below the piston of the power cylinder for reciprocating the welding torch which has location within and is carried by the hollow piston of the power cylinder. After a weld has been completed, the pressure medium is vented from above the piston and admitted below the piston so that the piston and torch will move upward to release the workpieces and which may then be moved for the next spot to be welded.

Another and more specific object of the invention is to provide novel and improved means for mounting a welding torch assembly within the hollow piston rod of a power cylinder and wherein adjustment of the welding torch longitudinally of the piston rod is made possible so that a spacing of the electrode with respect to the workpieces can be selected for the most efficient and satisfactory welding action.

A further object of the invention is to provide a welding torch assembly of the character described wherein a tungsten inert gas welding torch is mounted within the hollow piston rod of the power cylinder with provision for longitudinal adjustment and wherein the said welding torch is introduced and removed from the hollow piston rod from the top of the rod for the maximum convenience in servicing or replacing the welding torch.

With these and various other objects in view the invention may consist of certain novel features of construction and operation, as will be more fully described and particularly pointed out in the specification, drawings and claims appended thereto.

In the drawings which illustrate an embodiment of the device and wherein like reference characters are used to designate like parts—

FIGURE 1 is a sectional view taken vertically through the welding torch assembly of the invention;

FIGURE 2 is a top plan view of the welding torch assembly shown in FIGURE 1;

FIGURE 3 is an elevational view of the welding torch assembly as shown in said FIGURE 1; and FIGURE 4 is a fragmentary sectional view on an enlarged scale showing constructional details of the lower portion of the welding torch assembly.

The numeral 10 indicates the frame of a welding machine to which the cylinder 12 of a power cylinder is secured as by the fastening bolts 13. Since the welding torch assembly for Tig welding as contemplated by the invention, is carried by the piston 14 and by the hollow piston rod 15 of the power cylinder, it will be understood and appreciated that the torch assembly can thus be reciprocated with respect to the workpieces 16. This mode of operation makes possible the application of a holding pressure on the workpieces during the welding operation.

The cylinder 12 is supplemented by a bottom member 17 and by a bottom closure member 18, both members being releasably secured to the cylinder 12 so as to form a unit with said cylinder. The member 17 which is cored at 20 is secured to the cylinder 12 by the securing bolts 21, FIGURE 3. The bottom closure member 18 in the form of a washer is secured to member 17 by the securing bolts 22 as best shown in FIGURE 4. Since the passage 20 is adapted to receive the pressure medium for elevating the piston 14, a flexible sealing washer 23 is located at the joint between the members 17 and 18, and it will be seen that said washer provides a flexible flange for contact with the piston rod 15.

A somewhat similar structure is employed at the top end of the cylinder 12, the same including a top member 25, and a top closure member 26. The securing bolts 27 fasten the washer-like closure member 26 to the member 25 which in turn is secured by the bolts 28 to the cylinder 12. The member 25 is cored at 30 and a side passage is formed at 31 which is closed by the plug 32. The member 25 retains a resilient bumper 33 for absorbing the shocks incident to the upward movement of the piston 14. Also, a flexible sealing member 34 is located at the joint between members 25 and 26, and a flange is provided by the sealing washer for contact with the piston rod 15. The piston 14 may be grooved around its circumference for receiving the O-ring seal 35. A vertical bore 36 is formed in the wall of cylinder 12 for connecting the conduit 37 with the passage 31 and thus with the space above the piston 14. When a pressure fluid is admitted to this space, the piston is, of course, caused to travel downwardly. For forcing the piston in an upward direction, the pressure fluid is admitted to the conduit 38 which connects through passage 39 with the space below the piston. Thus by alternating the admission of pressure fluid to the space above and below the piston, and by simultaneously venting the opposite space, the piston and piston rod can be caused to reciprocate in a longitudinal direction.

In accordance with the invention the hollow piston rod 15 carries a welding torch generally indicated by the numeral 40 and preferably of the Tig type having a tungsten electrode 41 and an open passage extending around the electrode for flowing an inert gas to the welding area. The welding torch 40 is carried by a barrel or tubular shell 42, the same having a close fit within the hollow piston rod but which is longitudinally adjustable within the piston rod. This adjustment is effected by the shoulder 43 formed on the barrel 42 and by the threaded retainer ring 44. The retainer ring is threaded at 45 to the end of the piston rod projecting above the closure member 26. By rotating the retainer ring 44 the barrel 42 can be adjusted vertically to adjust the gap between the electrode 41 and the workpieces 16. The barrel is formed of insulating material for insulating the torch from the piston rod.

The end of the barrel 42, above the shoulder 43 and at the right side thereof as shown in FIGURE 1, is slotted at 46 in order to accommodate the fitting 47. The fitting is threaded to the welding torch 40 and thus the fitting connects the conduit 48 with the bore 50 extending longitudinally of the torch. The inert gas supplied by the conduit 48 is thus admitted by the fitting to the interior of the torch. The gas issues from the bottom openings 51 and flows through the bushing 52 and around the clamp 53. The clamp has releasable clamping engagement with the electrode 41, and the same is in turn threaded at its upper end to the welding torch 40. The inert gas is accordingly discharged from the annular passage around the electrode onto the work area. One or more slots or openings 54 may be provided in the nozzle 55 for venting the inert gases so that an adequate flow is maintained in the vicinity of the weld during the welding operation.

Provision is made for the insertion and removal of the welding torch 40 from the top end of the barrel 42. This construction as shown in FIGURE 1 includes the handle 56 preferably of insulating material and which is secured by the set screw 57 to the connector 58. The connector includes the enlarged section 60 and the threaded section 61 which is threaded into the end of the welding torch. The enlarged section is backed on both sides by pads of resilient material 62. The connector 58 and the pads 62 are retained by the retaining clamp 63 which is threaded to the end of the barrel and which, as shown in FIGURE 2, is split to form the spaced sections 64. The stud 65 is fastened by the bolts 66 to the retainer ring 44. The upper end of the stud 65 is located between the sections 64 and the said end is bifurcated for accommodating the clamping bolt 67. Said bolt clamps the sections 64 and fixedly secures the retaining clamp 63 in its adjusted threaded relation on the barrel. From the foregoing it will be understood that the retainer ring 44 is held by the pin 68 and also by the stud 65 with convenient provision for releasing the connections in the event it is desired to rotate the retainer ring for adjusting the electrode. Also, it will be seen that by releasing the clamp 63 and removing the same from the end of the barrel, the handle 56 can be grasped by the operator for withdrawing the torch from within the barrel and from the hollow piston rod.

The nozzle 55 is mounted for swivelling movement on the lower projecting end of the piston rod. For this purpose the upper surfaces 70 of the nozzle are arcuate, the center of the arc being located on the workpiece at the spot to be welded. The nozzle is backed by the nozzle holder 71 which is threaded to the piston rod. A retainer 72 is threaded to the holder and the inwardly directed flange 73 of the retainer holds the nozzle in loose connected relation with the holder. The swivelled nozzle thus accommodates itself to the workpieces.

By introducing compressed air or other pressure medium to the chamber above the piston, a compression force can be applied to the workpiece around the spot being welded. During the welding operation the shielding gases are introduced throught the fitting 47 and said gases flood the welding area and escape through the openings 54. The electrical terminal for connecting the electrode 41 to a source of current may be conveniently connected to the fitting 47.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. In an electric arc welding apparatus, the combination with a workpiece to be welded, of a power cylinder having a fixed relation with respect to the workpiece, a piston operating within the power cylinder and having a hollow piston rod projecting from at least one end of the power cylinder, a welding torch positioned within the hollow piston rod and providing an electrode extending beyond the projecting end of the piston rod, a nozzle loosely carried by the projecting end of the piston rod and in a manner permitting swivelling movement of the nozzle on an arc the center of which is on the workpiece, said nozzle having surrounding relation with the electrode and also having an open end for contact with the workpiece, whereby said nozzle due to its permissible swivelling movement will accommodate itself to the workpiece.

2. In an electric arc welding apparatus, the combination with a workpiece to be welded, of a power cylinder having a fixed relation with respect to the workpiece, a piston operating within the power cylinder and having a hollow piston rod projecting from both ends of the cylinder, a welding torch located within the hollow piston rod and providing an electrode extending beyond one projecting end of the piston rod, a nozzle carried by the said one projecting end of the piston rod and having surrounding relation with the electrode, said nozzle having an open end for contact with the workpiece, said nozzle and the said one projecting end of piston rod having such relation as to permit swivelling movement of the nozzle on an arc the center of which is on the workpiece, whereby said nozzle due to its permissible swivelling movement will accommodate itself to the workpiece, and means located at the opposite projecting end of the piston rod for adjusting the longitudinal position of the welding torch with respect to the piston rod whereby to adjust the gap between the electrode and the workpiece.

3. In an electric arc welding apparatus, the combination with a workpiece to be welded, of a power cylinder having a fixed relation with respect to the workpiece, a piston operating with the power cylinder and having a hollow piston rod projecting from both ends of the cylinder, a welding torch located within the hollow piston rod and providing an electrode extending beyond one projecting end of the piston rod, a barrel carrying the welding torch and which is located between the welding torch and the piston rod whereby the torch, barrel and piston rod are concentrically disposed, said barrel providing a shoulder beyond the other projecting end of the piston rod, an adjustable retainer ring on the piston rod and having contact with the shoulder for adjusting the barrel and thus the welding torch longitudinally with respect to the piston rod, whereby to vary the gap between the electrode and the workpiece, a nozzle carried by the said one projecting end of the piston rod and having surrounding relation with the electrode, and said nozzle having an open end for contact with the workpiece.

4. Electric arc welding apparatus as defined by claim 3, wherein the retainer ring is threaded on the other projecting end of the piston rod, and additionally including a nozzle holder fixed to the electrode projecting end of the piston rod, said nozzle having contact with the nozzle holder in a manner providing for swivelling movement, and a retaining ring carried by the nozzle holder and loosely holding the nozzle in associated relation with the nozzle holder.

5. In an electric arc welding apparatus, the combination with a workpiece to be welded, of a power cylinder having a fixed relation with respect to the workpiece, a piston operating within the power cylinder and having a hollow piston rod projecting from both ends of the cylinder, a welding torch located within the hollow piston rod and providing an electrode extending beyond one projecting end of the piston rod, a barrel carrying the welding torch and which is located between the welding torch and the piston rod whereby the torch, barrel and piston rod are concentrically disposed, the torch and barrel extending beyond the other projecting end of the piston rod, and handle means fixed to the said extending end of the welding torch for withdrawing the welding torch from the barrel at the end opposite the electrode.

6. In an electric arc welding apparatus, the combination with a workpiece to be welded, of a power cylinder having a fixed relation with respect to the workpiece, a piston operating within the power cylinder and having a hollow piston rod projecting from both ends of the cylinder, a welding torch located within the hollow piston rod and providing an electrode extending beyond one projecting end of the piston rod, a barrel carrying the welding torch and which is located between the welding torch and the piston rod whereby the torch, barrel and piston rod are concentrically disposed, the torch and barrel extending beyond the other projecting end of the piston rod, said extending end of the barrel having a slot therein, a fitting secured to the welding torch and extending through the slot, said fitting admitting a gaseous medium to the longitudinal bore of the welding torch, handle means fixed to the said extending end of the welding torch for withdrawing the welding torch from the barrel at the end opposite the electrode, and a nozzle carried by the piston rod at the electrode projecting end, said nozzle having surrounding relation with the electrode and said nozzle having an open end for contact with the workpiece.

7. Electric arc welding apparatus as defined by claim 6, wherein the nozzle is carried by the piston rod in a manner providing for swivelling movement of the nozzle on an arc the center of which is on the workpiece.

References Cited

UNITED STATES PATENTS

| 2,346,088 | 4/1944 | Shobert | 219—119 |
| 3,061,714 | 10/1962 | Van Sciver et al. | 219—127 |
| 3,132,240 | 5/1964 | McCartney | 219—127 |
| 3,213,261 | 10/1965 | Anderson | 219—127 |

JOSEPH V. TRUHE, Primary Examiner

R. F. STAUBLY, Assistant Examiner

U.S. Cl. X.R.

219—119, 130